Sept. 11, 1934.  E. KARL  1,973,285
GRASS SHEARS
Filed Feb. 5, 1934
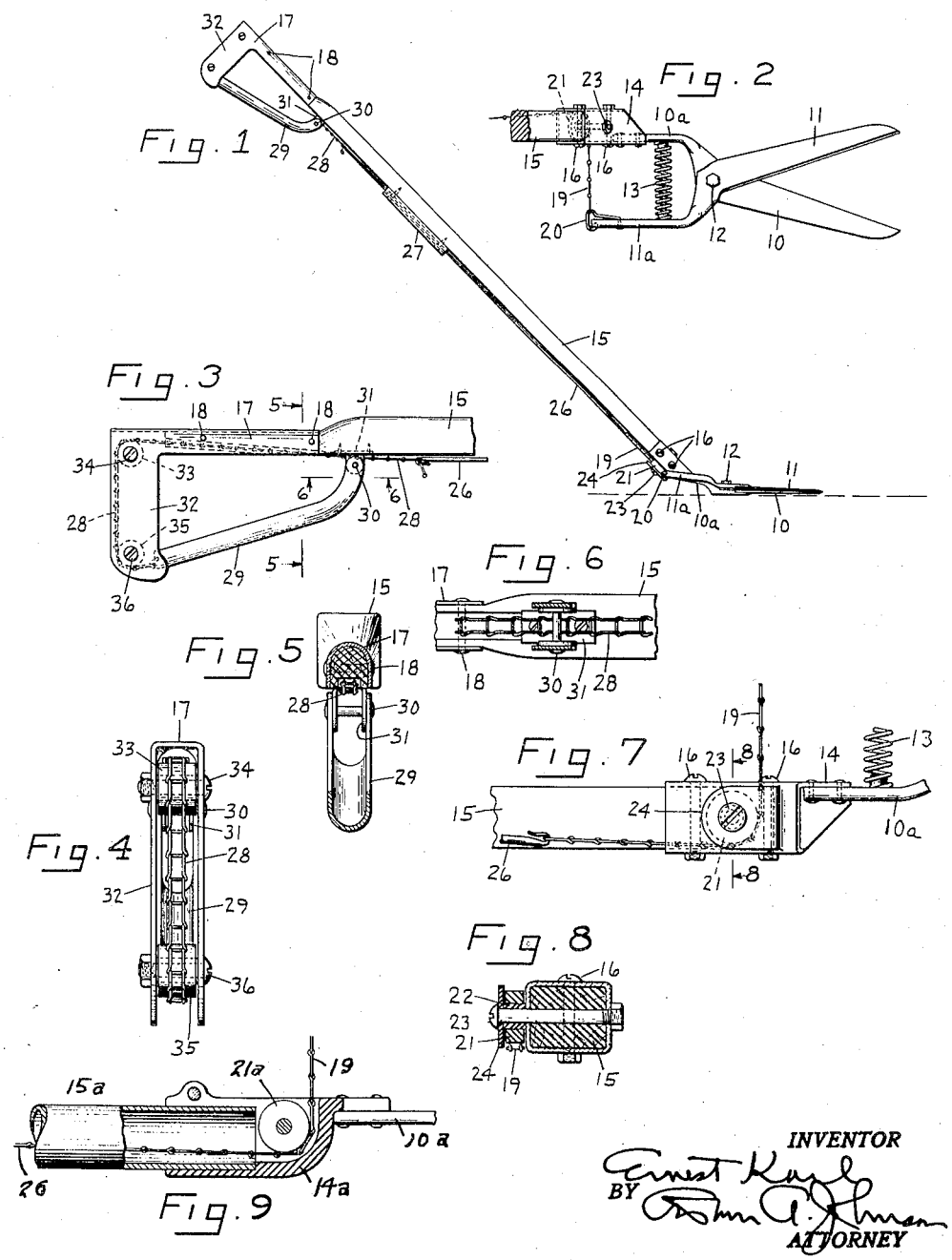

Patented Sept. 11, 1934

1,973,285

UNITED STATES PATENT OFFICE 1,973,285

GRASS SHEARS

Ernest Karl, Litchfield, Conn.

Application February 5, 1934, Serial No. 709,747

7 Claims. (Cl. 30—11)

This invention relates to grass shears, and more particularly, to those having a long handle so that they may be operated while the user is standing substantially erect.

An object of this invention is to provide grass shears of the kind specified which are simple and sturdy in construction, easily operated, and conveniently manipulated. With the grass shears of this invention, grass, weeds and other plants may be properly clipped close to fences, walks, monuments and other stones while the operator is standing erect, with comparatively little effort, since the relatively movable hand grips at the upper end of the handle have substantially the same kind of motion as handles located directly on the shears would have.

One of the important features of this invention is the provision of a train of connections between the fixed and movable blades and the fixed and movable hand grips, whereby very little load is added to the operation of the device by the mechanism itself. For this purpose, the blades and hand grips are interconnected by a train of connections, including flexible connections such as chains passing over pulleys to change their direction of movement.

Another feature of this invention is the provision of a fixed hand grip having a lateral extension formed integral therewith and forming a substantially L-shaped frame, and having the extension hollow so that the chain or other operating means may be housed thereby to protect the user's hands from coming into contact with the chain and possibly being pinched thereby. Preferably, the lateral extension on the handle has an open side into which the free end of a pivoted hand grip extends to be guided by the sides of the extension and to prevent the user's hand being caught between the end of the movable hand grip and the fixed hand grip.

A further feature of this invention is the arrangement whereby no fixed stop is necessary on the hand grip portion of the device, since the driving connections themselves limit the movement of the hand grip toward blade-closing position, and likewise yieldingly determines the position of the hand grip in blade-opening position. The relation between the movable hand grip and the chain guiding means is such that movement of the hand grip outwardly beyond a predetermined point tends to cause the blade to move toward closed position against the tension of the spring tending to hold them open.

Other features and advantages will hereinafter appear.

In the accompanying drawing which illustrates two forms of the present invention, including that at present preferred—

Figure 1 is a side elevation of my improved grass trimming shears.

Fig. 2 is a top plan view of the lower portion of the shears, showing the shear blades and the bracket for mounting the fixed blade on the long handle.

Fig. 3 is a side elevation of the hand grip portion of my grass trimming shears.

Fig. 4 is an end view of the handle portion of the device.

Fig. 5 is a transverse sectional view taken on the line 5—5 of Fig. 3 and looking in the direction of the arrows.

Fig. 6 is a detail sectional view taken on the line 6—6 of Fig. 3.

Fig. 7 is a view showing the lower end of the long handle and illustrating the bracket by means of which the fixed shear blade is secured to the long handle.

Fig. 8 is a sectional view taken on the line 8—8 of Fig. 7.

Fig. 9 is a view similar to Fig. 7 showing a modified form of this invention.

As shown in the accompanying drawing, the grass trimming shears of my invention, in the form illustrated herein and at present preferred, comprises a fixed blade 10 and a movable blade 11 pivoted at 12. The blades 10 and 11 have extensions 10a and 11a, and between these there is a spring 13 tending to keep the blades open. The extension 10a of the blade 10, as shown in Fig. 7, is riveted to a bracket 14 having a socket to receive the lower end of a long handle 15, which is preferably made of wood. When the handle is placed in the socket, bolts 16 pass therethrough and secure the handle 15 and bracket 14 together. The connection between the bracket 14 and the shear extension 10a is such that the fixed shear blade 10 may rest upon and slide along the ground, being substantially flat on the ground, while the handle 15 extends upwardly and rearwardly at an angle of about 45° to the ground, so that the user may remain standing substantially erect and manipulate the device.

At its upper end, the long handle 15 is reduced in dimensions and inserted in a sheet metal hand grip 17 secured to the handle 15 by bolts or rivets 18.

The extension 11a of the movable blade 11 is connected to the end of a chain 19 through a suitable clip 20 and extends toward the bracket 14 and then passes over a pulley 21 mounted on a bearing 22 carried by a bolt 23 extending through the bracket and through an arm 24 formed integral with the bracket 14. The bearing 22 is wider than the pulley 21, thereby insuring that the pulley will turn freely, and the chain is held from slipping off the pulley by being confined between the bracket 14 and the arm 24. The chain extends upwardly along the underside of the handle 15. Preferably, it is connected to a drag link 26 guided by a guide 27 and extending up to a point near the hand grip 17. At its upper end the drag link 26 is connected to a chain 28 which passes up through a slot in the reduced portion of the handle member and between the sides of the hand grip 17 which is hollow.

Thus, when the train of connections, comprising the chain 28, drag link 26, and chain 19, is pulled upwardly, this motion is converted by the pulley 21 to a horizontal motion, and the movable blade 11 is moved against the tension of the spring 13 and caused to slide over the blade 10 and cut the grass or other plants located between the blades.

In order that the movement of the operator's hand may be substantially the same as it would be if the shears were held directly in the hand, the present invention provides at the upper end of the long handle 15 a movable hand grip 29 pivoted at 30 to a bracket 31 secured to the long handle 15 and normally extending outwardly and upwardly with relation to the fixed hand grip 17.

The fixed hand grip 17 has a lateral extension 32 formed integral therewith. This hand grip unit, comprising the hand grip 17 and the extension 32, is substantially L-shape, and it is formed of a single sheet metal stamping substantially T-shaped as punched out, but having the stem of the T folded over to provide a socket for the upper end of the long handle 15 and the cross arms of the T placed in parallel overlying relation as shown in Fig. 4. There is thus produced a hollow frame or housing.

At the point where the extension 32 meets the fixed hand grip portion 17, there is provided a pulley 33 having a suitable spacing sleeve and a bolt 34 acting as the shaft for the pulley. Also, at the end of the extension 32 there is a pulley 35 similarly arranged and mounted on a bolt 36. The chain 28, which is connected to the upper end of the drag link and passes through the hollow and fixed hand grip 17, extends upwardly over the pulley 33 and then downwardly to the pulley 35, where it, after passing over the pulley 35, is connected to the free end of the movable hand grip 29.

When the fixed and movable hand grips 17 and 29 are held in the operator's hand and are drawn together by the closing thereof, the end of the chain will be pulled upwardly by the hand grip 29, as viewed in Fig. 3, thus pulling the other end of the chain to the left and pulling up on the drag link 26 to operate the movable shear blade 11.

It will thus be seen that the relative motion between the fixed and movable hand grips 17 and 29 is substantially the same as between the handles on ordinary shears. It should also be noted that the chain 28 is enclosed and housed by the hand grip 17 and extension 32, and that the free end of the movable hand grip 29 is located between the walls of the extension, and that the operator cannot thus casually catch any part of his hand in the chain or between the end of the movable hand grip and any fixed portion.

The movement of the movable hand grip 29 toward the fixed hand grip 17 is limited by the usual stop shoulders on the shear blades through the intermediary of the chain 19, drag link 16, and chain 28. The outward movement of the hand grip 29 is not positively limited, but there is no tendency for it to pass beyond the point shown in Fig. 3, because the end of the hand grip 29 is directly opposite the pulley 35. Should the hand grip 29, for any reason, tend to move beyond this point, it could do so but only after overcoming the resistance of the spring 13 which holds the shear blades apart, because the downward movement of the hand grip 29 from the position shown in Fig. 3 would tend to pull the chain 28 and the drag link 26 to the left, the same direction in which it is moved to operate the shears. The use of a stop, therefore, at the upper end of the hand grip is eliminated by the present invention.

As shown in Fig. 9, the long handle 15a may be made of a metal tube of pipe. In this case, the casting 14a is provided with a tubular socket to receive the lower end of the pipe, and the pulley 21a may be located inside the casting so that the chain 19 and drag link 26 may be located entirely within the pipe.

It is intended that the device of this invention be operated with one hand while the other hand grasps the handle 15 to hold and guide the device. This may be done conveniently by grasping the handle 15 at the place where the guide plate 27 is located, the latter serving the dual functions of insuring free movement of the drag link 26 and providing a convenient grip for the lower hand.

With the device of the present invention, it is possible to conveniently and easily trim grass close to fences, monuments, and other stones or obstructions to the use of ordinary lawn mowers, and along walks, while the operator still remains standing substantially upright and with as little effort as would be required to operate ordinary hand shears directly, for there is very little loss of power between the fixed and movable hand grips 17 and 29 and the fixed and movable blades 10 and 11, due to the use of joined non-resilient connections.

Variations and modifications may be made within the scope of this invention and portions of the improvements may be used without others.

Having thus described the invention, what is claimed as new and for which it is desired to obtain Letters Patent, is:—

1. Grass trimming shears comprising a long handle member; a blade fixed to the lower end of the handle member at an angle thereto so as to lie horizontally on the ground while the handle member is held inclined to the ground at an angle of about 45°; a cooperating movable blade pivotally mounted on the fixed blade; a spring between said blades normally tending to open the same; a chain connected to the movable blade; a pulley on the handle member over which said chain rides; a drag link connected to said chain extending upwardly longitudinally of said handle member; a fixed hand grip at the upper end of said handle member; a movable hand grip pivoted on the handle member adjacent said fixed hand grip; a lateral extension on said fixed hand grip; a chain connected to the upper end of said drag link; a pulley at the upper end of the fixed hand grip; and a pulley at the outer end of said lateral extension, said second-named chain riding successively over said two last-named pulleys and having its end secured to the movable hand grip, power being transmitted from said movable hand grip to said movable blade through said chains and drag link to cause said movable blade to slide over the fixed blade against the tension of said spring for cutting purposes.

2. Grass trimming shears comprising a long handle member; a blade fixed to the lower end of the handle member at an angle thereto so as to lie horizontally on the ground while the handle member is held inclined to the ground at an angle of about 45°; a cooperating movable blade pivotally mounted on the fixed blade; a spring between said blades normally tending to open the same; a chain connected to the movable blade; a pulley on the handle member over which said chain rides; a fixed hand grip at the upper end of said handle member; a movable hand grip pivoted on the handle member adjacent said fixed hand grip; a lateral extension on said fixed hand grip; a chain connected to the upper end of said drag link; a pulley at the upper end of the fixed hand grip; a pulley at the outer end of said lateral extension, said second-named chain riding successively over said two last-named pulleys and having its end secured to the movable hand grip; and means transmitting power from said movable hand grip and second-named chain to said first-named chain and said movable blade to cause said movable blade to slide over the fixed blade against the tension of said spring for cutting purposes.

3. Grass trimming shears comprising a long handle member; a blade fixed to the lower end of the handle member at an angle thereto so as to lie horizontally on the ground while the handle member is held inclined to the ground at an angle of about 45°; a cooperating movable blade pivotally mounted on the fixed blade; a spring between said blades normally tending to open the same; a hand grip at the upper end of said handle member; means for operating said movable blade including a movable hand grip located adjacent said first-named hand grip and including a drag link located on the exterior of the long handle member; and an auxiliary hand grip on said long handle member including a housing for guiding the drag link and covering the same against engagement with the operator's hand when the latter grips the long handle at said auxiliary hand grip.

4. Grass trimming shears comprising a long handle member; a blade fixed to the lower end of the handle member at an angle thereto so as to lie horizontally on the ground while the handle member is held inclined to the ground at an angle of about 45°; a cooperating movable blade pivotally mounted on the fixed blade; a spring between said blades normally tending to open the same; a fixed hand grip at the upper end of said handle member; a movable hand grip pivoted on the handle member adjacent said fixed hand grip; a lateral extension on said fixed hand grip; a chain connected to the upper end of said drag link; a pulley at the upper end of the fixed hand grip; a pulley at the outer end of said lateral extension, said chain riding successively over said two last-named pulleys and having its end secured to the movable hand grip; and means transmitting power from said movable hand grip and chain to said movable blade to cause the latter to slide over the fixed blade against the tension of said spring, the lateral extension of the fixed hand grip having a slot open on one side, and the free end of the movable hand grip extending through and being guided by the walls of said slot.

5. Grass trimming shears comprising a long handle member; a blade fixed to the lower end of the handle member at an angle thereto so as to lie horizontally on the ground while the handle member is held inclined to the ground at an angle of about 45°; a cooperating movable blade pivotally mounted on the fixed blade; a spring between said blades normally tending to open the same; a fixed hand grip at the upper end of said handle member; a movable hand grip pivoted on the handle member adjacent said fixed hand grip; a lateral extension on said fixed hand grip; a chain connected to the upper end of said drag link; a pulley at the upper end of the fixed hand grip; a pulley at the outer end of said lateral extension, said chain riding successively over said two last-named pulleys and having its end secured to the movable hand grip; and means transmitting power from said movable hand grip and chain to said movable blade to cause the latter to slide over the fixed blade against the tension of said spring, the lateral extension of the fixed hand grip being hollow and having one open side, the free end of the movable hand grip extending into the extension through said slot, and the portion of the chain extending from the free end of the movable hand grip to the adjacent pulley being housed by said lateral extension.

6. Grass trimming shears comprising a long handle member; a blade fixed to the lower end of the handle member at an angle thereto so as to lie horizontally on the ground while the handle member is held inclined to the ground at an angle of about 45°; a cooperating movable blade pivotally mounted on the fixed blade; a spring between said blades normally tending to open the same; a fixed hand grip at the upper end of said handle member; a movable hand grip pivoted on the handle member adjacent said fixed hand grip; a lateral extension on said fixed hand grip; a chain connected to the upper end of said drag link; a pulley at the upper end of the fixed hand grip; a pulley at the outer end of said lateral extension, said chain riding successively over said two last-named pulleys and having its end secured to the movable hand grip; and means transmitting power from said movable hand grip and chain to said movable blade to cause the latter to slide over the fixed blade against the tension of said spring, the fixed hand grip and lateral extension being integral, substantially L-shaped, and hollow to house the chain and protect the user's hand from contact therewith.

7. Grass trimming shears comprising a long handle member; a blade fixed to the lower end of the handle member at an angle thereto so as to lie horizontally on the ground while the handle member is held inclined to the ground at an angle of about 45°; a cooperating movable blade pivotally mounted on the fixed blade; a spring between said blades normally tending to open the same; a fixed hand grip at the upper end of said handle member; a movable hand grip pivoted on the handle member adjacent said fixed hand grip; a lateral extension on said fixed hand grip; a chain connected to the upper end of said drag link; a pulley at the upper end of the fixed hand grip; a pulley at the outer end of said lateral extension, said chain riding successively over said two last-named pulleys and having its end secured to the movable hand grip; and means transmitting power from said movable hand grip and chain to said movable blade to cause the latter to slide over the fixed blade against the tension of said spring, the end of the movable hand grip being located adjacent the pulley at the end of the lateral extension, so that movement of the movable hand grip beyond normal fully extended position would tend to pull the chain and operate the movable cutting blade against the tension of the spring which opposes such excessive outward movement of the movable hand grip.

ERNEST KARL.